US012333041B1

(12) United States Patent
Rahman et al.

(10) Patent No.: US 12,333,041 B1
(45) Date of Patent: Jun. 17, 2025

(54) DATA SHARING WITH FEDERATED ACCESS PERMISSIONS

(71) Applicant: Amazon Technologies, Inc., Seattle, WA (US)

(72) Inventors: Mohammad Foyzur Rahman, Newark, CA (US); Vladimir Ponomarenko, Redwood City, CA (US); William Michael McCreedy, Berlin (DE); Ramy Nazier, Oranienburg (DE); Pavel Sokolov, Menlo Park, CA (US); Venkata Naga Raja Sri Harsha Kesapragada, Sunnyvale, CA (US); Karsten Jancke, Frankfurt (DE); Kostiantyn Dymov, Berlin (DE); Dmytro Lebedyev, Braunschweig (DE); Vinay Singh, Sammamish, WA (US); Krishnaditya Kandregula, Redmond, WA (US); Sharda Kishin Khubchandani, Belmont, CA (US); Sachet Saurabh, Sammamish, WA (US); Purvaja Narayanaswamy, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 176 days.

(21) Appl. No.: 18/058,841

(22) Filed: Nov. 25, 2022

(51) Int. Cl.
G06F 21/62 (2013.01)

(52) U.S. Cl.
CPC .. G06F 21/6227 (2013.01); *G06F 2221/2113* (2013.01); *G06F 2221/2141* (2013.01)

(58) Field of Classification Search
CPC ...... G06F 21/6227; G06F 21/30; G06F 21/31; G06F 21/60; G06F 21/62; G06F 2221/2113; G06F 2221/2141
See application file for complete search history.

(56) References Cited

U.S. PATENT DOCUMENTS

| 11,201,747 | B2 * | 12/2021 | Scherrer | H04L 9/3242 |
| 11,467,878 | B2 * | 10/2022 | Theimer | G06F 16/184 |
| 11,494,386 | B2 * | 11/2022 | Li | G06F 16/258 |
| 11,531,682 | B2 * | 12/2022 | Kramer | G06F 16/256 |

(Continued)

OTHER PUBLICATIONS

U.S. Appl. No. 17/548,406, filed Dec. 10, 2021, Ippokratis Pandis, et al.

*Primary Examiner* — Hosuk Song
(74) *Attorney, Agent, or Firm* — S. Scott Foster; Kowert, Hood, Munyon, Rankin & Goetzel, P.C.

(57) ABSTRACT

A federated permission management service provides clients with customized access to a data set using customized authorization metadata. The federated permission management service may define and apply permissions that are defined at a data lake that provides access to many different data sets from many different sources, as well as those permissions that may be defined at the source of the data set, which may be provided when performing a data sharing request. By allowing for permissions to be specified at the data lake in addition to permissions specified at a source of a data set, the permission management service can provide a fine-grained access control to specific objects of the data set, such as specific columns, specific rows, or specific cells of a database to be shared, even for those data sets in the data lake having different sources.

20 Claims, 10 Drawing Sheets

(56) References Cited

U.S. PATENT DOCUMENTS

| | | | |
|---|---|---|---|
| 11,546,307 B2* | 1/2023 | Kulkarni | H04L 67/10 |
| 11,616,690 B2* | 3/2023 | Feiguine | H04L 41/0813 |
| | | | 709/223 |
| 11,650,856 B2* | 5/2023 | Chen | G06F 8/60 |
| | | | 718/104 |
| 11,755,764 B2* | 9/2023 | Theimer | G06F 21/602 |
| | | | 726/29 |
| 11,764,948 B1* | 9/2023 | Rambhia | H04L 9/0819 |
| | | | 380/277 |
| 2014/0173702 A1 | 6/2014 | Wong et al. | |
| 2020/0252406 A1 | 8/2020 | Padmanabhan et al. | |
| 2020/0379995 A1 | 12/2020 | Rajaperumal et al. | |

\* cited by examiner

Receive a request to obtain access to a data set, at a federated permission management service, from a first query engine.
910

Determine a first set of access permissions as applicable to the first query engine out of different sets of access permissions according to a user association of the first query engine, such that the first set of access permissions as applied to the one or more objects of the data set is different than a second set of access permissions of the different sets of access permissions as applied to the one or more data objects of the data set, and both the first set of access permissions and the second set of access permissions provide access to at least some of the data set.
920

Generate the first set of access permissions for the data set specified via an interface at the federated permission management service, such that the first set of access permissions is one of different sets of access permissions applicable to query engines that access the data set.
930

Send the first set of access permissions to the first query engine.
940

*FIG. 9*

DATA SHARING WITH FEDERATED ACCESS PERMISSIONS

BACKGROUND

As the technological capacity for organizations to create, track, and retain information continues to grow, a variety of different technologies for managing and storing the rising tide of information have been developed. Database systems, for example, provide many clients with access to different sets of information stored in a database. However, the increasing number of different sets of information that organizations must store and manage for the respective clients often correspondingly increases both the size and complexity of data storage and management technologies, like database systems, which in turn escalate the cost of maintaining the information.

BRIEF DESCRIPTION OF THE DRAWINGS

FIG. 9 is a high-level flowchart illustrating methods and techniques to implement generating federated permissions to allow access to custom data sets for different clients, according to some embodiments.

Figure 1:
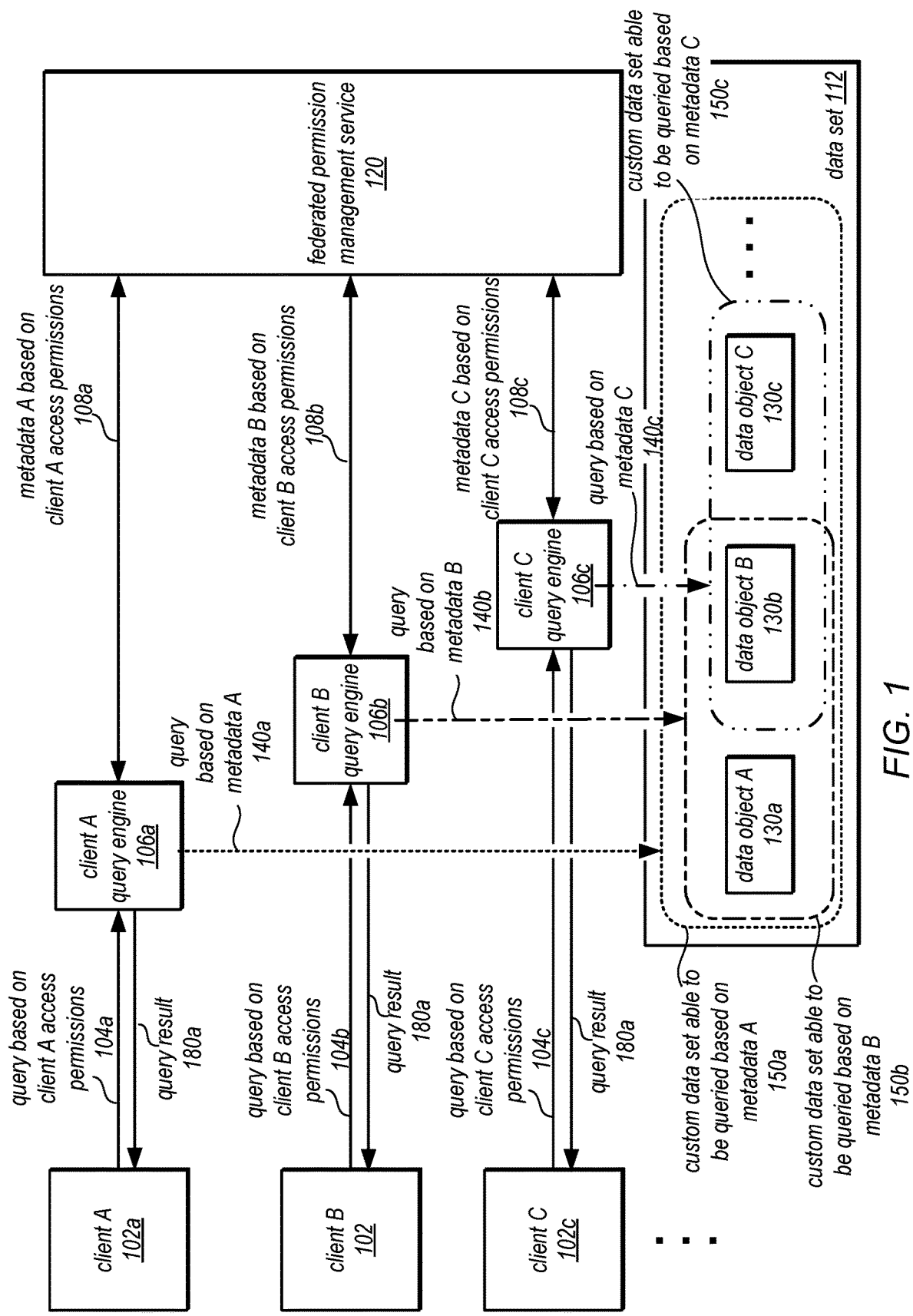
FIG. 1 illustrates a logical block diagram illustrating a federated permission management service that provides access to custom data sets for respective query engines based on access permissions associated with their respective clients, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (e.g., meaning having the potential to), rather than the mandatory sense (e.g., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of providing access to custom data sets stored in a data lake service for clients using federated permissions, according to some embodiments are described herein. In some embodiments, one or more data stores may be requested to provide data to various clients for analysis and state information for products, processes, or systems, or any other use case for a data set. For example, different clients of a data lake may have access to different portions of the data lake and may query the data lake to access the stored data. Because the different clients may have different permissions to access the data lake, the one technique could be to generate different copies to allow access to different versions of the data set that correspond to the different portions and permissions of the different clients. While data store migration and other data transmission techniques exist to copy a data set from one location to another in order to grant the clients or other entities access to the data lake, such techniques escalate the cost of maintaining the information (e.g., as multiple copies are created of, at least partially, redundant data and the computational costs of creating and updating these copies can consume processor, network, memory, and various other computing resources). Moreover, such techniques do not offer the producer of the data set control over the dissemination of its data. Instead, once copied it can be difficult to ensure the accuracy of or limit the use of the data. Furthermore, because a copy of the data set may be a snapshot or version of the data set at a point in time, changes to the data set that occur after the migration of the data set would not be incorporated into the data set without having to obtain another copy of the data set.

In various embodiments, a federated permission management service may provide to respective clients customized authorization metadata based on federated permissions obtained by the federated permission management service. The federated permission management service may provide a custom view or other custom access to one or more data objects of the data set based on its respective access permissions, without having to use the resources create and update copies of data objects in multiple locations in order to grant the custom access to different clients. For example, the federated permission management service may use customized authorization metadata. Furthermore, because in the federated permission management service data may flow directly from the source data object to the clients via the federated permission management service, this federated permission management service may define and apply additional permissions that are defined in the directly at the federated permission management service, as well as those sent along with a data sharing request as federated permissions by a producer or source of the data set to be shared (e.g., allowing for combined permissions). In this way, the federated permission management service can provide a fine-grained access control to specific objects of the data set. For example, the federated permission management service may allow specific columns, specific rows, or specific cells of a database to be shared, even those having different data producers. In some embodiments, the federated permission management service may be used to establish a data lake-wide permissions that encompass multiple databases. Moreover, the centralized nature of the federated permission management service, may facilitate integration of multiple database services. For example, with the federated permission management service, data consumers may only have to integrate with the federated permission management service instead of the data producers.

FIG. 1 illustrates a logical block diagram illustrating a federated permission management service that provides access to custom data sets for respective query engines based on access permissions associated with their respective clients, according to some embodiments. A federated permission management service 120 may be a stand-alone data lake management service, in various embodiments. For example, federated permission management service 120 may be implemented for private use (e.g., on private networks and resources for entity-specific utilization). In some embodiments, federated permission management service 120 may be implemented as part of a data lake management service and/or as part of multiple different services provided by a cloud service provider (e.g., across multiple regions), such as provider network 200 discussed in detail below with regard to FIG. 2.

In some embodiments, clients, such as client A 102a, client B 102b, and client C 102c, may send queries to respective query engines, such as client A query engine 106a, client B query engine 106b, and client C query engine 106c. The respective clients may request the respective query engines for one or more data objects of a data set 112. In some embodiments, these data set 112 may be a data lake comprised of one or more databases (which will be further discussed in FIGS. 2-3). Upon receipt of the respective queries (queries based on client access permissions 104a, 104b, and 104c), the respective client query engines 106a, 106b, and 106c may send requests to the federated permission management service 120 to retrieve metadata to perform the query requests. In some embodiments, the query engine 106 may be a part of a database service that supports the processing and movement of user data through the database service. In some embodiments, queries, such as queries based on client access permissions 104 may be requests to add or remove data, and may be communicated via data plane interfaces (e.g., database connection protocols that communicate directly with database engines) of the database service (which will be further discussed in FIG. 3). In some embodiments, the control plane of the database service may represent the movement of control signals through the database service to implement various features of the service, such as obtaining authorization metadata from the federated permission management service.

In some embodiments, the data set 112 may be created and hosted in a data lake service on behalf of a data owner or other entity, referred to herein as the producer. The data set 112 may be one or more database stored for in a data lake or other data storage system (e.g., remote or attached to producer database engine). In some embodiments, the database service implementing the query engines 106, may furthermore implement producer database engines (e.g., one or more computing resources, such as a processing cluster discussed in detail below with regard to FIG. 3), which may provide access to the database data to the federated permission management service 120. The producer database engine may receive a request to share database data and thereby obtain the role of "producer" for database data (e.g., as data may be added or removed to database data via producer database engine). As discussed in detail below with regard to FIG. 4, sharing the database may create a "datashare" object (e.g., a logical object, such as an identifier for the datashare allowing the datashare to be referenced in various requests to manage or access the datashare). Producer database engine may propose database sharing authorization with a client. Once one or more portions of the data set 112 is confirmed to be shared by the federated permission management service 120, the federated permission management service 120 may use the federated permissions to send metadata to access the database based on the client access permissions, such as metadata A based on client A access permissions 108a, metadata B 108b, and metadata C 108c. In some embodiments, additional permissions may be defined by the federated permission management service based on the federated permissions and schema information of the data set 112. For example, in some embodiments, the federated permission management service 120 may obtain a "simple" or surface-level metadata from the producer database engine of the data that is being queried such that the federated permission management service 120 may view the metadata that backs the datashare. The "simple" or surface-level metadata may not contain decorations or encryption keys/credentials to query the underlying data but may expose metadata such as the structure/schema of the database such that additional permissions may be defined by the federated permission management service 120. In some embodiments, the simple metadata may include object ID, name combination, column names and their types, etc. In some embodiments, the similar simple metadata may be used by the federated permission management service 120 to determine whether the clients 102 have access permissions for the data as requested in the initial queries 104.

In some embodiments, data set may be stored and organized into one or more schemas (e.g., for one or more database tables). These schemas may indicate how to interpret database data at a database engine (e.g., at a producer database engine or a consumer database engine), such as by indicating what type of data is stored in a column, feature, or other attribute of database data. Metadata may include schema information pertaining to the data set 112 as well as information, such as data object addresses and encryption keys used to access data as requested in the query 104. In some embodiments, various statistics that describe the contents of database data (e.g., histograms of data values, minimum and maximum values, etc.) may also be stored as part of metadata. In some embodiments, the metadata may be organized in various data objects, such as a superblock, which may map portions of metadata to one (or more) data blocks in the data set. In addition to data sharing permissions defined by the producer database engine, the federated permission management service 120 may furthermore define additional permissions that further restrict access to the data as will be discussed in FIG. 4.

Client database engines 106 may use the metadata based on client access permissions 108a. 108b, and 108c to perform queries on the data set 112. The queries may be performed based on the metadata received as authorized by the federated permission management service 120. The clients may be able to view the underlying structure for the data sets and the objects associated with the datashare in order to query the query engine. For example, client A 102*a* may view a custom data set able to be queried based on metadata A 150*a* based on the metadata 108*a* retrieved by the client A 102*a*. Similarly client B 102*b* may view a custom data set able to be queried based on metadata B 150*b* based on the metadata 108*b* retrieved by the client B 102*b* and Similarly client C 102*c* may view a custom data set able to be queried based on metadata C 150*c* based on the metadata 108*c* retrieved by the client C 102*c*. The different clients (e.g., 102*a*, 102*b*, 102*c*) may have different permissions such that the custom data set able to be queried based on metadata 150 are different from one another. For example, the custom data set able to be queried based on metadata B 150*b* may include data object A 130*a* and data object B 130*b* whereas the custom data set able to be queried based on metadata C 150*c* may include data object B 130*b* and data object C 130*c*. In some embodiments the custom data set may view all data objects, such as the custom data set able to be queried based on metadata A 150*a* as illustrated in FIG. 1. In such manner, the federated permission management service 120 may provide custom views to one or more data objects of the data set based on their respective access permissions by granting the clients custom access by using the customized authorization metadata without the need to copy the data objects from one location to another.

Please note that the previous description of a federated permission management service is a logical description and thus is not to be construed as limiting as to the implementation of query engines, a database service, data sets, and performance of queries, or portions thereof.

This specification continues with a general description of a provider network that implements multiple different services, including a federated permission management service and storage services, which may implement providing access to custom data sets stored in a data lake service for a client using federated permission management. Then various examples of the database service and storage service, including different components/modules, or arrangements of components/module that may be employed as part of implementing the services are discussed. A number of different methods and techniques to providing access to custom data sets stored in a data lake service for a client using federated permission management are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
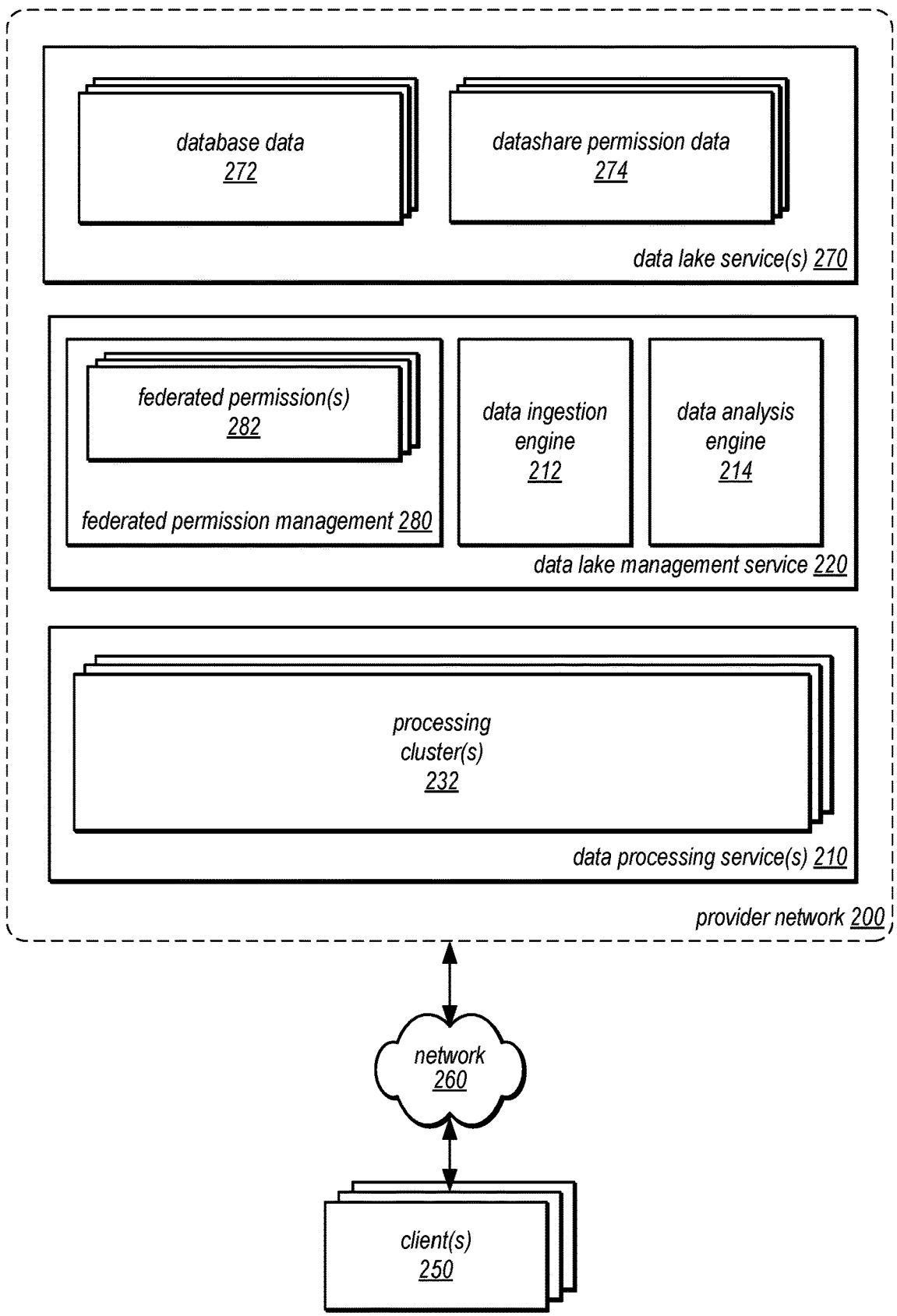
FIG. 2 is a logical block diagram illustrating a provider network offering a data lake management service that manages authorization between data lake services and data processing services and provides access to custom data sets for respective clients, according to some embodiments.

FIG. 2 is a logical block diagram illustrating a provider network offering a data lake management service that manages authorization between data lake services and data processing services and provides access to custom data sets for respective clients, according to some embodiments. Provider network 200 may be a private or closed system or may be set up by an entity such as a company or a public sector organization to provide one or more services (such as various types of cloud-based storage) accessible via the Internet and/or other networks to clients 250.

Provider network 200 may be implemented in a single location or may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and storage services offered by the provider network 200. In some embodiments, the provider network 200 can be formed as a number of regions, where a region is a separate geographical area in which the cloud provider clusters data centers. Each region can include two or more availability zones connected to one another via a private high-speed network, for example a fiber communication connection. An availability zone ("AZ", also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the provider network 200 via a publicly accessible network (e.g., the Internet, a cellular communication network).

Regions are connected to a global network which includes private networking infrastructure (e.g., fiber connections controlled by the cloud provider) connecting each region to at least one other region. The provider network 200 may deliver content from points of presence outside of, but networked with, these regions by way of edge locations and regional edge cache servers. An edge location can be an extension of the cloud provider network outside of the traditional region/AZ context. For example an edge location can be a data center positioned to provide capacity to a set of customers within a certain latency requirement, a set of servers provided to a customer's premises, or a set of servers provided within (or forming part of) a cellular communications network, each of which can be controlled at least in part by the control plane of a nearby AZ or region. This compartmentalization and geographic distribution of computing hardware enables the provider network 200 to provide low-latency resource access to customers on a global scale with a high degree of fault tolerance and stability.

In some embodiments, provider network 200 may implement various computing resources or services, such as data processing service(s) 210, (e.g., relational database services, non-relational database services, a map reduce service, a data warehouse service, and/or other large scale data processing services or various other types database services), data lake service(s) 270 (e.g., database services, object storage services, or block-based storage services that may implement a centralized data store for various types of data), data lake management service 220, and/or any other type of network based services (which may include a virtual compute service and various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below. In various embodiments, the functionality of a given system or service component (e.g., a component of data processing service 210 or data lake service 270) may be implemented by a particular node or may be distributed across several nodes. In some embodiments, a given node may implement the functionality of more than one service system component (e.g., more than one data store component).

Data processing services 210 may be (or included in) various types of data processing services that perform general or specialized data processing functions (e.g., anomaly detection, machine learning, data mining, big data querying, or any other type of data processing operation). For example, in at least some embodiments, data processing services 210 may include a map reduce service that creates clusters of processing nodes that implement map reduce functionality over data stored in the map reduce cluster as well as data stored in the data lake service(s) 270. In another example, data processing services 210 may include various types of database services (both relational and non-relational) for storing, querying, and updating data. Such services may be enterprise-class database systems that are highly scalable and extensible. Queries may be directed to a data set such as a database in the data processing service 210 that is distributed across multiple physical resources, and the resource configurations, such as processing cluster(s) 232, used to process the queries may be scaled up or down on an as needed basis.

Data processing service 210 may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system. For instance, data processing service 210 may implement, in some embodiments, a data warehouse service, that utilizes another data processing service, to execute portions of queries or other access requests with respect to data that is stored in a remote data store, such as data lake service(s) 270 (or a data store external to provider network 200) to implement distributed data processing for distributed data sets.

In at least some embodiments, data processing service 210 may be a data warehouse service. Thus, in the description that follows, data processing service 210 may be discussed according to the various features or components that may be implemented as part of a data warehouse service, including a control plane, proxy service, and processing cluster(s) 232. Note that such features or components may also be implemented in a similar fashion for other types of database services and thus the following examples may be applicable to other types of data processing service 210. Data processing service 210 may implement one (or more) processing clusters that are attached to a database (e.g., a data warehouse). In some embodiments, these processing clusters may be designated as a primary and secondary (or concurrent, additional, or burst processing clusters) that perform queries to an attached database warehouse.

In embodiments where data processing service 210 is a data warehouse service, the data warehouse service may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes. In some embodiments, the disk requirements may be further reduced using compression methods that are matched to the columnar storage data type. For example, since each block contains uniform data (e.g., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

Data processing service 210 may be implemented by a large collection of computing devices, such as customized or off-the-shelf computing systems, servers, or any other combination of computing systems or devices, such as the various types of systems 1000 described below with regard to FIG. 10. Different subsets of these computing devices may be controlled by a control plane. The control plane may provide a cluster control interface to clients or users who wish to interact with the processing cluster(s) 232 managed by control plane 320. For example, the control plane may generate one or more graphical user interfaces (GUIs) for clients 250, which may then be utilized to select various control functions offered by the control interface for the processing cluster(s) 232 hosted in the data processing service 210. Control plane 320 may provide or implement access to various metrics collected for the performance of different features of data processing service 210, including processing cluster performance, in some embodiments.

Control plane may also implement various systems to manage or implement data processing service features. For example, control plane may implement datashare metadata service and metadata proxy service and may be used to implement datashares accessible across provider network 200 regions. Data used to implement these features, such as datashare permission data 274 may be maintained in separate data lake service(s) 270, in some embodiments. Federated permission management 280, which may allow for the creation, evaluation, and enforcement of various access control policies with respect to accounts, principals, identities, roles, services, or resources in provider network 200 may work with a data lake management service 220 to implement federated datashare permission policies 282, as discussed in detail below in FIG. 4.

As discussed above, various clients (or customers, organizations, entities, or users) may wish to store and manage data using a data processing service 210. Processing cluster(s) 232 may respond to various requests, including write/update/store requests (e.g., to write data into storage) or queries for data (e.g., such as a Server Query Language request (SQL) for particular data), as discussed below with regard to FIGS. 4 and 5. For example, multiple users or clients may access a processing cluster to obtain data warehouse services.

For data sets manually managed by users, data processing service 210 may provide database endpoints directly to the clusters which allow the users manage in order to implement client applications that send requests and other messages directly to a particular cluster. Database endpoints, for example may be a network endpoint associated with a particular network address, such as a URL, which points to a resources, such as processing cluster(s) 232 that are attached to the database for query processing. For instance, a client may be given the network endpoint "http://myclus-ter.com" to send various request messages to. Multiple clients (or users of a particular client) may be given a database endpoint for the same database. Various security features may be implemented to prevent unauthorized users from accessing the databases. In at least some embodiments, data processing service 210 may implement proxy service to provide access to databases (e.g., data warehouses) hosted in data processing service 210.

Processing clusters 232 hosted by data processing service 210 may provide an enterprise-class database query and management system that allows users to send data processing requests to be executed by the clusters 232, such as by sending a query. Processing clusters 232 may perform data processing operations with respect to data stored locally in a processing cluster, as well as remotely stored data. For example, data lake service 270 implemented by provider network 200 that stores remote data, such as backups or other data of a database stored in a cluster. In some embodiments, database data 272 may not be stored locally in a processing cluster 232 but instead may be stored in data lake service 270 (e.g., with data being partially or temporarily stored in processing cluster 232 to perform queries). Queries sent to a processing cluster 232 (or routed/redirect/assigned/allocated to processing cluster(s)) may be directed to local data stored in the processing cluster and/or remote data. Therefore, processing clusters may implement local data processing, such as local data processing. (discussed below with regard to FIG. 3) to plan and execute the performance of queries with respect to local data in the processing cluster, as well as a remote data processing client.

As databases are created, updated, and/or otherwise modified, snapshots, copies, or other replicas of the database at different states may be stored separate from data processing service 210 in data lake service 270, in some embodiments. For example, a leader node, or other processing cluster component, may implement a backup agent or system that creates and store database backups for a database to be stored as database data 272 in data lake service 270. Database data 272 may include user data (e.g., tables, rows, column values, etc.) and database metadata (e.g., information describing the tables which may be used to perform queries to a database, such as schema information, data distribution, range values or other content descriptors for filtering out portions of a table from a query, etc.). A timestamp or other sequence value indicating the version of database data 272 may be maintained in some embodiments, so that the latest database data 272 may, for instance, be obtained by a processing cluster in order to perform queries. In at least some embodiments, database data 272 may be treated as the authoritative version of data, and data stored in processing clusters 232 for local processing as a cached version of data.

Data lake service 270 may allow an organization to generate many different kinds of data, stored in one or multiple collections of data objects in the data lake service 270. In some embodiments, the data lake service 270 may implement different types of data stores for storing, accessing, and managing data on behalf of clients 250 as a network-based service that enables clients 250 to operate a data storage system in a cloud or network computing environment. Data lake service(s) 270 may also include various kinds of object or file data stores for putting, updating, and getting data objects or files. For example, one data lake service 270 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object. The data objects in the collection may include related or homogenous data objects, such as database partitions of sales data, as well as unrelated or heterogeneous data objects, such as audio files and web site log files. Data lake service(s) 270 may be accessed via programmatic interfaces (e.g., APIs) or graphical user interfaces.

Generally speaking, clients 250 may encompass any type of client that can submit network-based requests to provider network 200 via network 260, including requests for storage services (e.g., a request to create a datashare at a data processing service 210, or a request to create, read, write, obtain, or modify data in data lake service(s) 270, etc.). For example, a given client 250 may include a suitable version of a web browser, or may include a plug-in module or other type of code module that can execute as an extension to or within an execution environment provided by a web browser. Alternatively, a client 250 may encompass an application such as a database application (or user interface thereof), a media application, an office application or any other application that may make use of data processing service(s) 210 or storage resources in data lake service(s) 270 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments a data lake management service 220 may include the federated permission management 280, data ingestion engine 212, and data analysis engine 214. The data lake management service 220 may use the data ingestion engine 212 and the data analysis to integrate various data lake service that allow ingesting, cleaning, cataloging, transforming, and securing data for various applications. In some embodiments, the data lake management service 220 may provide clients 250 a central console where the client can discover data sources, set up transformation jobs to move data to the data lake services 270, remove duplicates/match records, catalog data for access by analytic tools, configure data access and security policies, audit and control access from analytics and machine learning ("ML") services, and perform other governance functions for the data lake services 270. Furthermore, in some embodiments, data lake management service 220 may be used to integrate data transformation jobs spanning various services of the provider network. Data lake management service 220 may be used to configure data flows, centralize orchestration of the data flows, and monitor the transformation jobs. In some embodiments, the federated permission management engine 280 may verify that the respective queries from the client 250 to the data processing service 210 to have permission to access the requested data objects of the data set. The data lake management service 220 may provide to the clients, via the data processing service 210, a custom view of one or more data objects of the data stored in the data lake service 270 based on the respective access permissions of the client without the need to copy the data objects from one location to another (as further discussed in FIG. 5). The data lake management service 220 may facilitate access requests by various clients 250 having differing permission, the customized authorization metadata to allow the data processing service 210 to retrieve the relevant data from the data lake services 270 as discussed in FIG. 5.

In some embodiments, a client 250 may provide access to provider network 200 to other applications in a manner that is transparent to those applications. For example, client 250 may integrate with an operating system or file system to provide storage on one of data lake service(s) 270 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data lake service(s) 270 may be coordinated by client 250 and the operating system or file system on behalf of applications executing within the operating system environment. Similarly, a client 250 may be an analytics application that relies upon data processing service(s) 210 to execute various queries for data already ingested or stored in the data processing service (e.g., such as data maintained in a data warehouse service).

Clients 250 may convey network-based services requests (e.g., access requests to read or write data may be directed to data in data lake service(s) 270, or operations, tasks, or jobs, such as queries, being performed as part of data processing service(s) 210) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet. In some embodiments, clients of data processing services 210 and/or data lake service(s) 270 may be implemented within provider network 200 (e.g., an application hosted on a virtual computing resource that utilizes a data processing service 210 to perform database queries) to implement various application features or functions and thus various features of client(s) 250 discussed above may be applicable to such internal clients as well.

Figure 3:
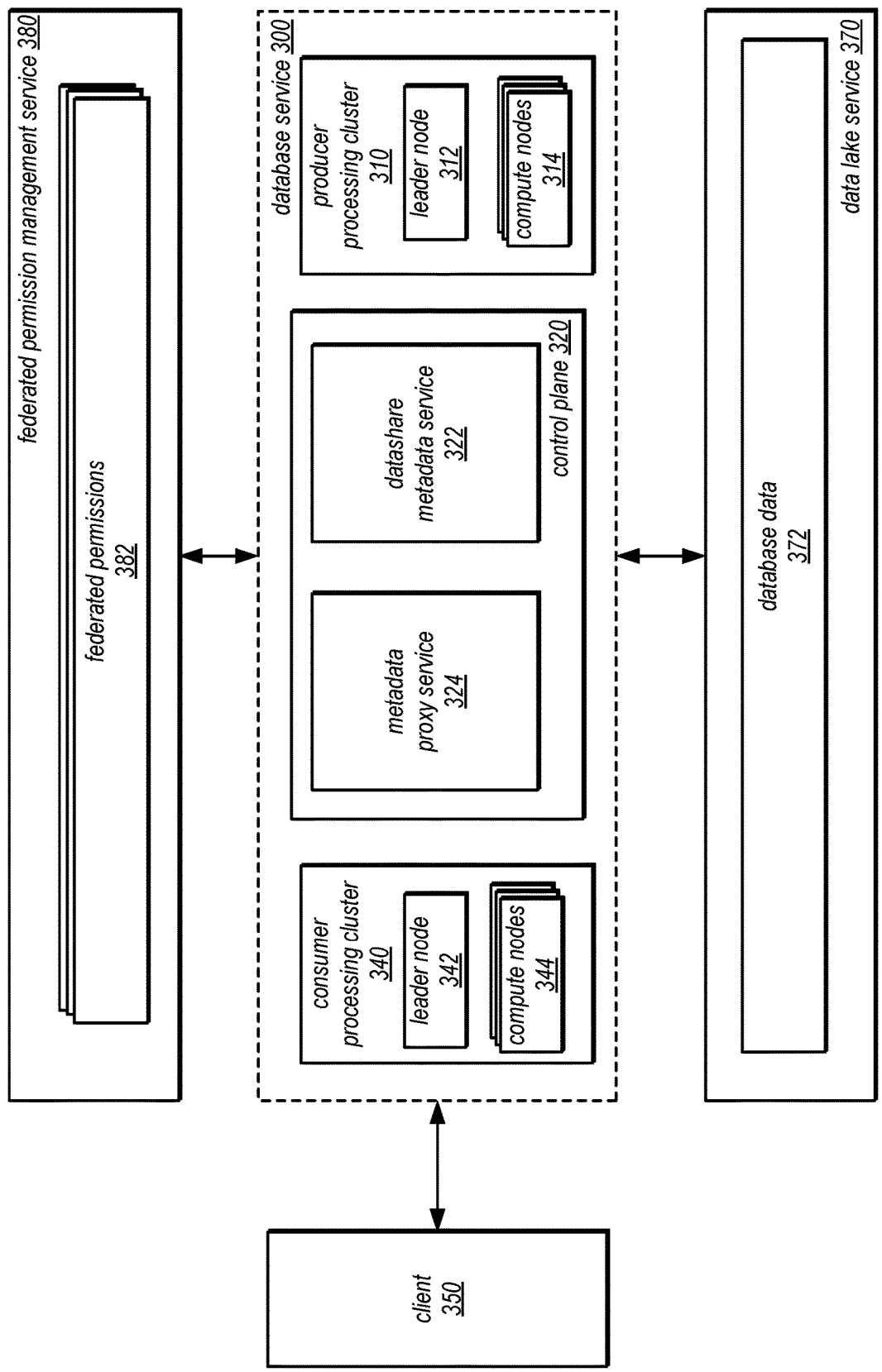
FIG. 3 is a logical block diagram illustrating a federated permission management service and a database service that provides access to custom data sets of a database in a data lake service to a client, according to some embodiments.

FIG. 3 is a logical block diagram illustrating a federated permission management service and a database service that provides access to custom data sets of a database in a data lake service to a client, according to some embodiments. In some embodiments, a database service 300 may include a producer processing cluster 310, a consumer processing cluster 340, and a control plane 320 that implements a metadata proxy service 324 and a datashare metadata service 322. Although FIG. 3 illustrates the producer processing cluster 310 and the consumer processing cluster 340 as part of the same database service 300, embodiments are not limited to the embodiments or drawings described and may be part of different database services.

In some embodiments, a consumer processing cluster 340 may be query processing cluster, like query engine 106 discussed above with regard to FIG. 1. The consumer processing cluster 340 may distribute execution of a query among multiple computational (which may also be referred to as "compute") nodes. As illustrated in this example, a consumer processing cluster 340 may include a leader node 342 and various compute nodes 344, which may communicate with each other over an interconnect (not illustrated). Leader node 342 may implement query planning to generate query plan(s), query execution for executing queries on processing cluster that perform data processing that can utilize remote query processing resources for remotely stored data such as database data 372 stored in a data lake service 370. In some embodiments, each node in a processing cluster may include attached storage, on which a database (or portions thereof) may be stored on behalf of clients (e.g., users, client applications, and/or storage service subscribers).

Note that in at least some embodiments, query processing capability may be separated from compute nodes, and thus in some embodiments, additional components may be implemented for processing queries. Additionally, it may be that in some embodiments, no one node in consumer processing cluster 340 is a leader node as illustrated in FIG. 3, but rather different nodes of the nodes in consumer processing cluster 340 may act as a leader node or otherwise direct processing of queries to data stored in consumer processing cluster 340. While nodes of processing cluster may be implemented on separate systems or devices, in at least some embodiments, some or all of processing cluster may be implemented as separate virtual nodes or instance on the same underlying hardware system (e.g., on a same server).

In some embodiments, a producer processing cluster 310 may be similarly structured as the consumer processing cluster 340. The producer processing cluster 310 may distribute execution of a query among multiple compute nodes to write or edit data stored in the data lake service 370. Similar to the consumer processing cluster, a producer processing cluster 310 may include a leader node 312 and various compute nodes 314, which may communicate with each other over an interconnect (not illustrated). Leader node 312 may implement query planning to generate query plan(s), query execution for executing queries on processing cluster that perform data processing that can utilize remote query processing resources for remotely stored data such as database data 372 stored in a data lake service 370.

The leader nodes 312 and 342 may manage communications with clients 350, similar to clients 250 discussed above with regard to FIG. 2. In some embodiments, leader nodes 312 and 342 may communicate with proxy service 240 and may receive query and return query results to proxy service (instead of communicating directly with a client application). Leader nodes 312 and 342 may be nodes that receives a query similar to query 104 from various client programs (e.g., applications) and/or subscribers (users) (either directly or routed to leader node 342 from proxy service 240), then parses them and develops an execution plan (e.g., query plan(s)) to carry out the associated database operation(s)). A database schema, data format and/or other metadata information may be received by the federated permission management service 380 for the data stored among the compute nodes, such as the data tables stored in the cluster, may be managed and stored by leader nodes 312 and 342.

In some embodiments, query planning to retrieve data from a data lake service 370 may be performed based on metadata received from the federated permission management service 380. Query planning may account for remotely stored data by generating node-specific query instructions that include remote operations to be directed by individual compute node(s). Although not illustrated, in some embodiments, a leader node may implement burst manager to send a query plan generated by query planning to be performed at another attached processing cluster and return results received from the burst processing cluster to a client as part of results.

In some embodiments, the consumer processing cluster 340 and the producer processing cluster 310 may also include compute nodes, such as compute nodes 344 and 314 implemented on servers or other computing devices, such as those described below with regard to computer system 1000 in FIG. 10, and each may include individual query processing "slices" defined, for example, for each core of a server's multi-core processor, one or more query processing engine(s) to execute the instructions generated from the query metadata received from the federated permission management service 380. The processing clusters may direct the execution of remote data processing operations, by providing remote operations, to remote data processing clients. As noted above in FIG. 2, in some embodiments, remote data processing clients may read, process, or otherwise obtain data, in response from database data 372 in data lake service 370, which may further process, combine, and or include them with results of location operations. This database data 372 may, in some embodiments, be a datashare in another region of provider network 200, as discussed in detail below with regard to FIG. 2. Compute nodes 314 and 344 may send intermediate results from queries back to the respective leader nodes 312 and 342 for final result generation (e.g., combining, aggregating, modifying, joining, etc.). Remote data processing clients may retry data requests that do not return within a retry threshold.

In some embodiments, the control plane 320 may implement various systems to manage or implement database service 300 features. For example, control plane 320 may implement datashare metadata service 322 and metadata proxy service 324 and these systems may be used to implement datashares and datashare policies accessible across provider network 200 regions as discussed in FIG. 1. Data used to implement these features, such as datashare permission data may be maintained in separate data lake service(s) 370, in some embodiments. The federated permission management service 380, may maintain a collection of such access permissions of the datashare as federated permission 382 that allow for federation of various access control policies with respect to accounts, principals, identities, roles, services 382 and will be discussed in FIG. 4-5.

Figure 4:
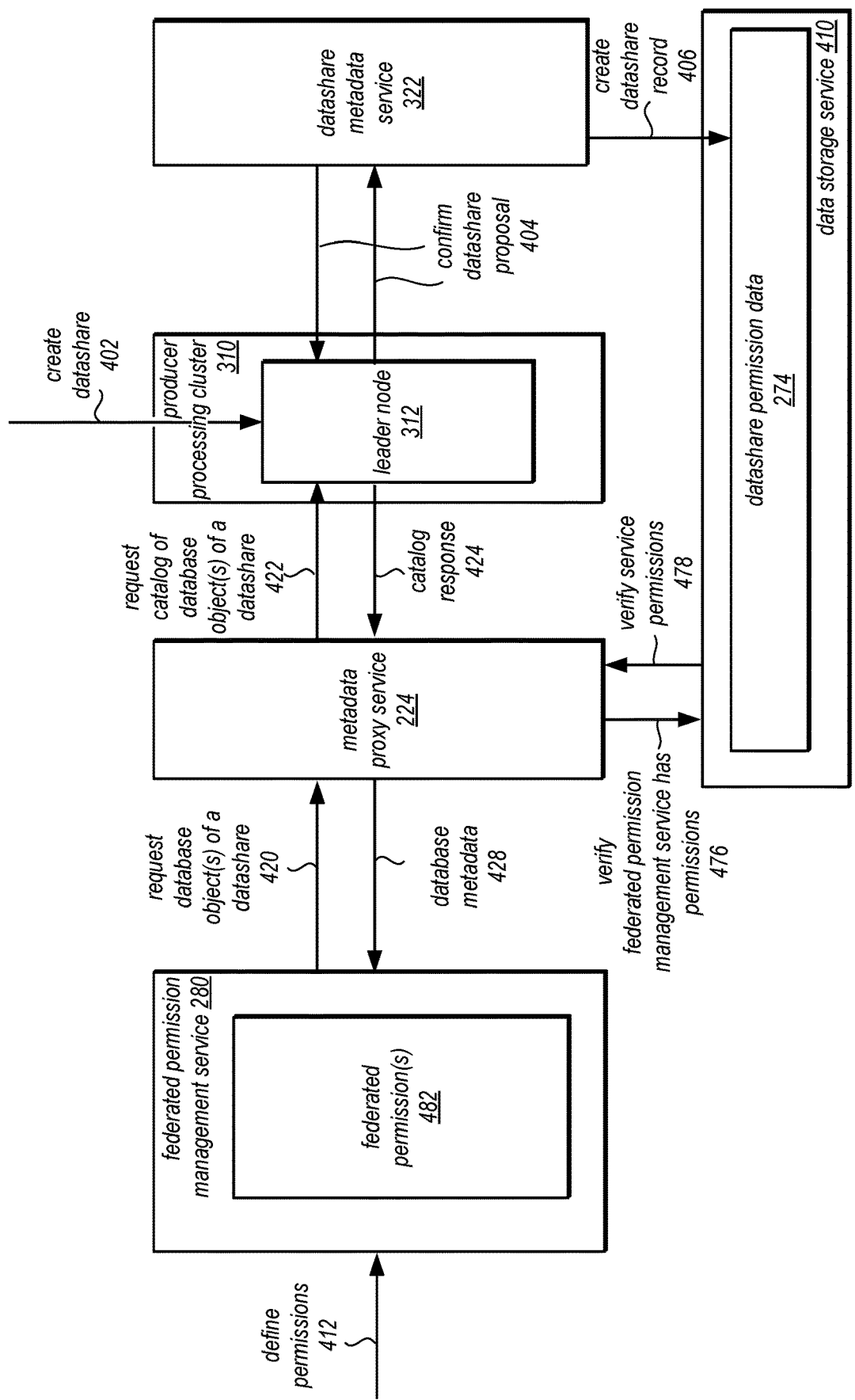
FIG. 4 is a logical block diagram illustrating interactions to define permissions in a federated permissions management service to allow access to custom data sets, according to some embodiments.

FIG. 4 is a logical block diagram illustrating interactions to define permissions in a federated permissions management service to allow access to custom data sets, according to some embodiments. In some embodiments, a producer processing cluster 310 may implement a leader node which may receive a request to create a datashare 402, which may allow data processing cluster 310 to respond to requests for metadata and access credentials for accessing the database data. Request to create a datashare may be received through an interface that communicates with producer processing cluster 310 (e.g., a command line or other data plane interface or programmatic interface), such as an interface that may also accept queries and other data access requests. For example, a SQL or other query language-like command may be performed. Leader node 312 may confirm the creation of the datashare as a datashare proposal to a datashare metadata service 322, which in turn may create a corresponding datashare record 406 stored in datashare permission data 274 in a data storage service 410. In some embodiments the database permission data 274 may be stored externally in a data lake service 270 accessible to the producer processing cluster as illustrated in FIG. 2. Datashare metadata service 322 may furthermore update the datashare record in database permission data 274. For example, the record may be updated to confirm, grant, or acknowledge authorization granted by the proposed datashare, such as updates to the accounts that are allowed to use the datashare.

In some embodiments, as indicated at 412, the federated permission management service 280 may receive a request to define permissions, including fine-grained permissions to allow, specific columns, specific rows, or specific cells of a database to be shared. The request to define permissions may furthermore include data lake-wide permissions that encompass multiple databases managed by the federated permission management service 280. Upon receipt of the request to define permissions, the federated permission management service 280 may send a request for database object(s) of a datashare 420 associated with the permissions request 412 to a metadata proxy service 224. The metadata proxy service 224 may route data sharing requests to the appropriate producer cluster or clusters associated with the permissions request 412 and request a catalog of database object(s) of the datashare 422 from the producer processing cluster 310. In some embodiments, the metadata proxy service 224 may verify that the user associated with the permissions request 412 has proper authorization to make the request to database objects of the datashare 420.

The producer processing cluster 310 may return a catalog response 424 of the catalog of database objects of the datashare that may be used by the metadata proxy service 224. The metadata proxy service 224, subsequent to the catalog response 424, may verify that the federated permission management service has permissions 476 to access the datashare according to the datashare permission data 274. In some embodiments the metadata proxy service 224 may perform a policy lookup on behalf of the federated permission management service according to the datashare policy stored in the datashare permission data 274. Upon verification that the federated permission management service 280 has permissions to access the datashare, the metadata proxy service 224 sends the database metadata 428 to the federated permission management service 280. In some embodiments, the database metadata 478 may comprise a simple metadata such as database column names and types that may be used to define additional federated permissions as discussed in FIG. 1. The simple or surface-level metadata may not contain decorations or encryption keys/credentials to query the underlying data but may expose metadata such as the structure/schema of the database such that additional permissions may be generated. A schema may be described by the metadata that is received from the producer database engine, which may include various information used to understand the database when accessed by the consumer database engine. The federated permission management service 280 may store the database metadata 428 from the metadata proxy service 224 and store the information as part of the federated permissions 482.

Figure 5:
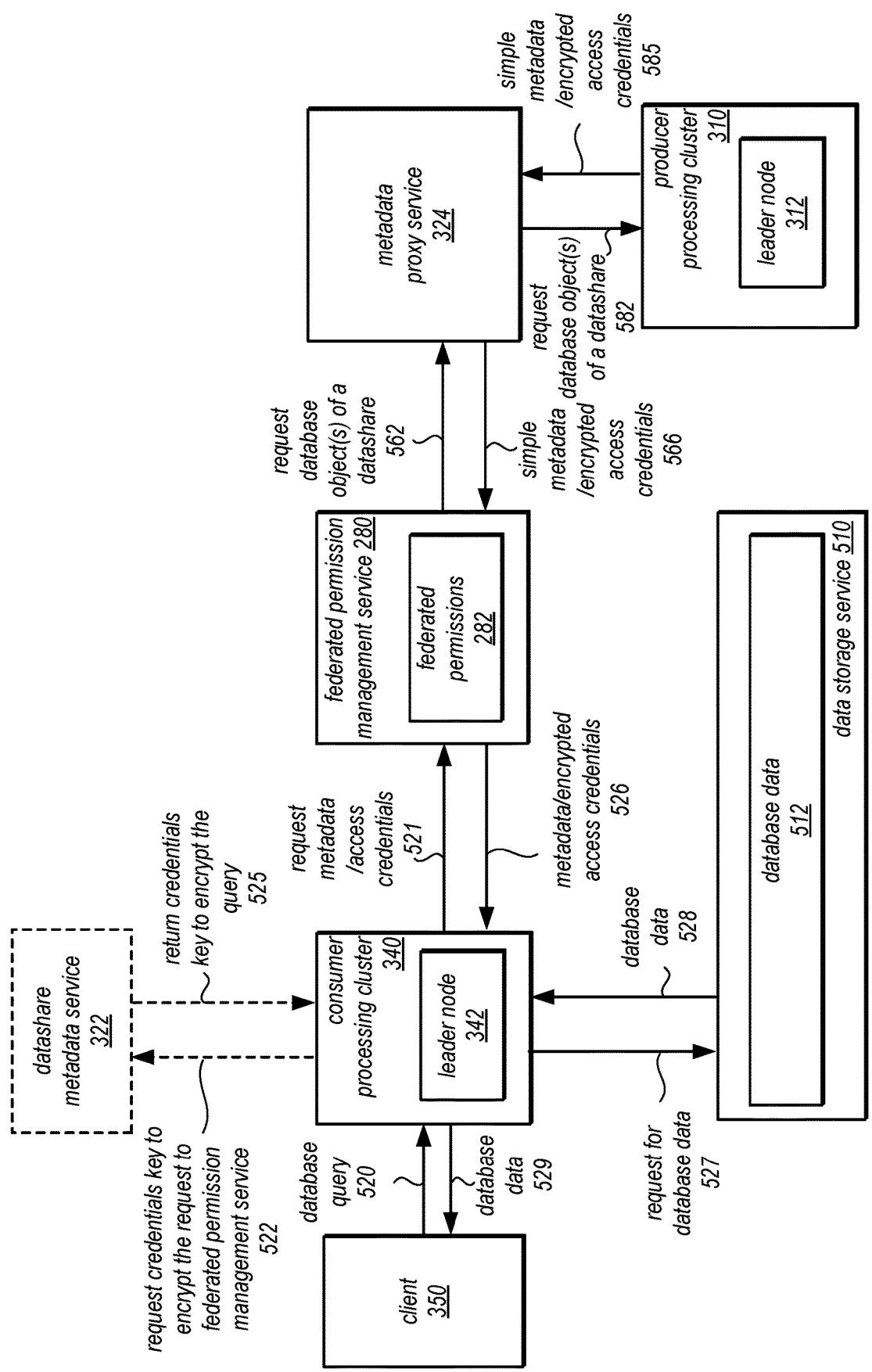
FIG. 5 is a logical block diagram illustrating interactions of a federated permission management service to perform database queries to custom data sets, according to some embodiments.

Based on the define permissions 412 request, the federated permissions management service 280 may generate and store additional permissions that are object specific, columns specific, rows specific, and/or cells specific permissions and provide a custom view/access to one or more data objects of the data set based on its respective access permissions without the need to copy the data objects from one location to another (which will further be discussed in FIG. 5).

FIG. 5 is a logical block diagram illustrating interactions of a federated permission management service to perform database queries to custom data sets, according to some embodiments. As discussed above with regard to FIG. 4, a federated permission management service 280 may federate access permissions and datashare resource policies used to enforce access controls on a shared database. Moreover, the federated permission management service 280 may authorize additional permissions/policies which may reference the datashare and thus may increase the granularity of control when providing access to many datashares across many accounts. By acting in between the producer processing cluster and the consumer processing cluster, the federated permission management service 280 may allow for control plane features to quickly shutdown data plane operations, e.g., by performing commands to remove attached datashare resource policies, and thus effectively controlling access to the datashare.

As indicated at 520, a database query for one or more objects of a database may be received at a leader node 342 of a consumer processing cluster 340. The leader node 342 may send a request for metadata/access credential 521 to a federated permission management service 280. In some embodiments, the consumer processing cluster 340 may request credentials key to encrypt the metadata request to federated permission management service 522. The datashare metadata service 322 may access database permission data in order to determine whether the association between a user of with the query engine and the datashare may proceed (e.g., yes, no because not authorized, no because an unauthorized region, etc.), and based on the determination return credentials key to encrypt the request for metadata/access credentials 521. The consumer processing cluster 340 may encrypt the metadata request 521 sent to the federated permission management service 280. In other embodiments, the federated permission management service 280 may implicitly trust the consumer processing cluster 340 The federated permission management service 280 may then send a request for database objects of a datashare 562 to the metadata proxy service 224.

The metadata proxy service 224 may validate if the client associated the query request to the consumer processing cluster has permission on the datashares from a given producer and the metadata proxy service 224 may then forward the request for database object(s) of a datashare 582 to the leader node 312 of the producer processing cluster 310. The producer processing cluster may respond with the simple metadata and encrypted access credentials 585 to metadata proxy service 324. As discussed above, in some embodiments, the producer processing cluster prepares a metadata response that may include multiple parts such as, a simple metadata (discussed above in FIG. 1 and FIG. 4) and a complex metadata. As discussed above, the simple metadata may be used by federated permission management service 220 (columns names and types) to generate and filter fine grained (e.g., column-level, row-level, cell-level permissions) while the encrypted access credentials may be metadata that allows the consumer processing cluster 340 to fetch the data from a data storage service 510. The complex metadata may be encrypted as an encrypted data blob that may be decrypted by keys known only to the datashare metadata service 322 and the producer processing cluster 310. In some embodiments, a metadata key ("MEK") may be used by the producer processing cluster 310 to derive a blob encryption key ("BEK") that is stored in a datashare database that is only readable when the consumer processing cluster 340 validates its access credentials with the datashare metadata service 322.

In some embodiments, the metadata proxy service 280 may then return the simple metadata and encrypted access credentials 586 to the federated permission management service 280. The federated permission management service 280 may verify whether the client 350 of the consumer processing cluster 340 is allowed based on the federate permission(s) 282, including the fine-grained permissions defined by the federate permission management service 280 discussed in FIG. 4. Based on the verification that the client 350 of the consumer processing cluster 340 is allowed access to data according to the information obtained from the simple metadata (e.g., column name of a database), the federated permission management service 280 sends metadata and access credentials 526 used to query the data storage service 510. The consumer processing cluster 340 may and decrypt the obtained metadata and utilize the decrypted metadata 526 obtained from the federated permission management service 280 to generate a query plan to perform the query, including various instructions, operations, or other steps to perform a request for the database data 527 to the data storage service 510. The data storage service 510 returns the requested database data 528 from the database data 512 according to the request. The consumer processing cluster 340 may return the respective data as query results 529. Please note that FIG. 5 illustrates one embodiment of a distributed permission model wherein the flow of encrypted access credentials from the producer processing cluster to the consumer processing cluster may be based on a chain of trust established between each component of the chain. Various other embodiments may encompass a different chain of trust and between different components of the access credentials/metadata flow.

Figure 6:
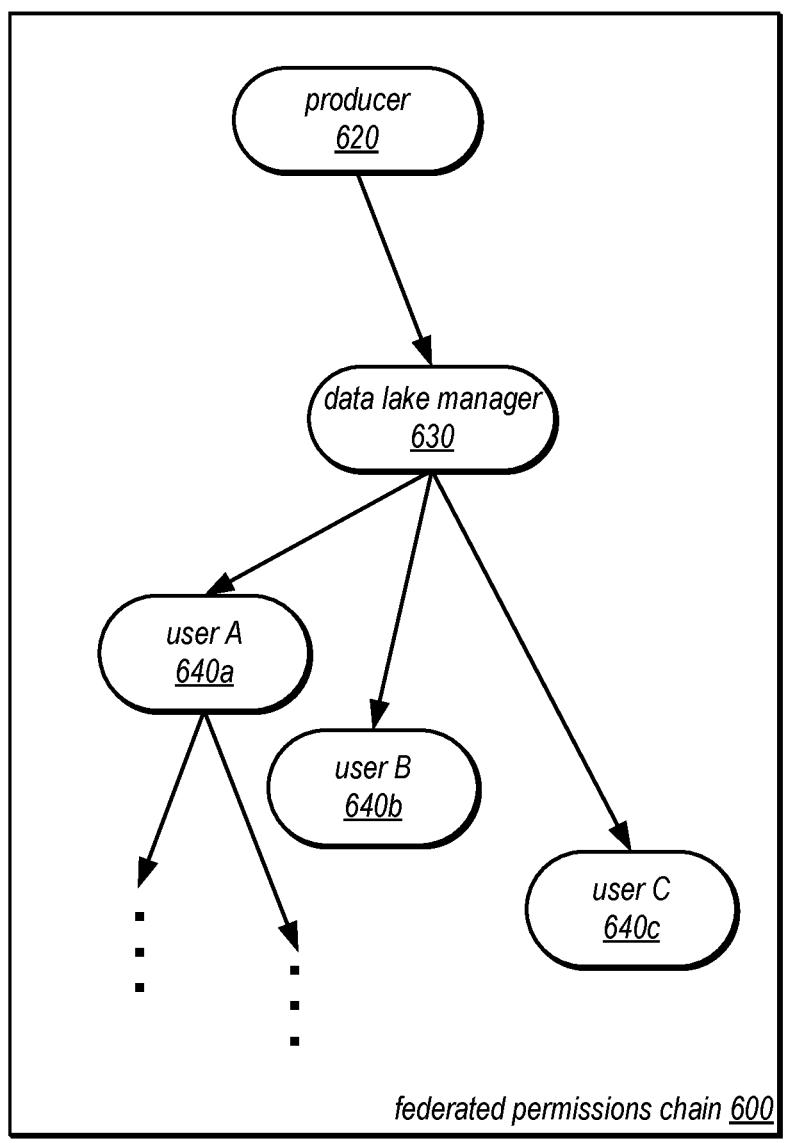
FIG. 6 is a logical block diagram illustrating an example federated permissions chain for a federated permissions management service, according to some embodiments.

FIG. 6 is a logical block diagram illustrating an example federated permissions chain for a federated permissions management service, according to some embodiments. In some embodiments, the federated permissions of the model federated permission management service may implement a delegation-based data sharing mechanism using multiple entities in a chain of datashare permissions. For example, a producer 620 may delegate or otherwise give access to one or more data objects of a data set stored in a data storage service to a data lake manager 630. The access permissions may be similar to permissions defined by the federated permissions management service as discussed in FIG. 4. In some embodiments, the data lake manager 630 in turn may delegate access, including sharing the data set with other users, such as user A 640a, user B 640b, and user C 640c. The one or more users or entities receiving access permissions in a chain of permissions may receive access that is narrower than the access given to the data lake manager 630. The users may receive permission that have applied applying additional filters and/or may have datashares of a subset of the tables. In some embodiments, the federated permissions management service may support chaining permissions from a single data lake manager to other users which in turn may further grant or delegate access permissions to other entities.

Although FIGS. 2-6 have been described and illustrated in the context of a provider network implementing a database service, like a data warehousing service, the various components illustrated and described in FIGS. 2-6 may be easily applied to other database engines that implement sharing database data. As such, FIGS. 2-6 are not intended to be limiting as to other embodiments of providing access to custom data sets stored in a data lake service for a client using a federated permission management.

Figure 7:
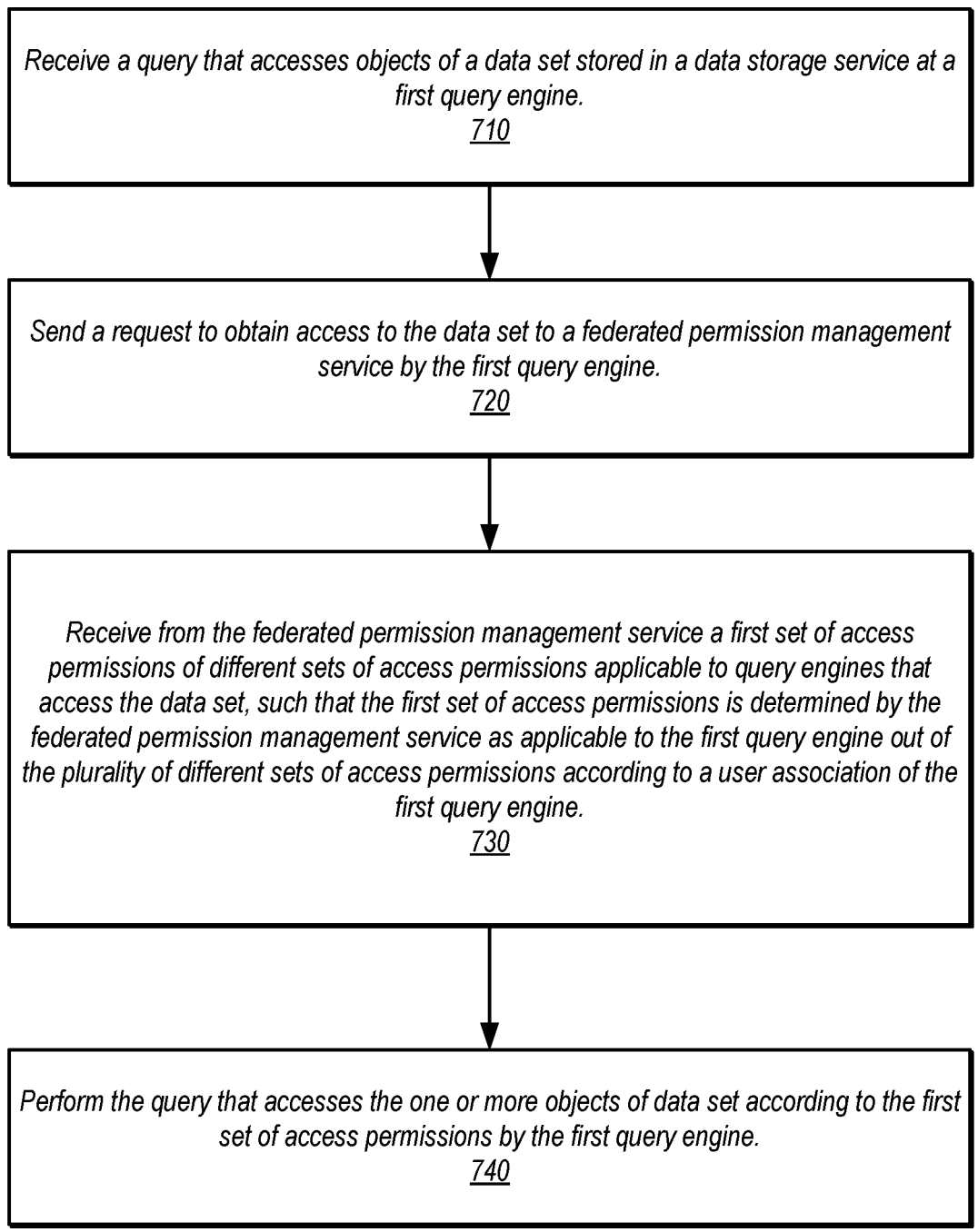
FIG. 7 is a high-level flowchart illustrating methods and techniques to implement providing access to custom data sets stored in a data lake service for a client using federated permissions, according to some embodiments.

FIG. 7 is a high-level flowchart illustrating methods and techniques to implement providing access to custom data sets stored in a data lake service for a client using federated permissions, according to some embodiments. Various different systems and devices may implement the various methods and techniques described below, either singly or working together. Different combinations of services implemented in different provider networks operated by different entities may implement some or all of the methods (e.g., a data warehouse cluster in a service of a first provider network, an intermediate data processing service in a second provider network, and a data set stored in a service of a third provider network). Different types of query engines or non-distributed query performance platforms may implement these techniques. Alternatively, various other combinations of different systems and devices located within or without provider networks may implement the below techniques. Therefore, the above examples and or any other systems or devices referenced as performing the illustrated method, are not intended to be limiting as to other different components, modules, systems, or devices.

As indicated at 710, a query that accesses objects of a data set stored in a data storage service may be received at a first query engine, in various embodiments. As discussed in detail above with regard to FIGS. 3 and 5, the first query engine may be a consumer processing cluster that is able to distribute execution of a query among multiple computational nodes. The consumer processing cluster may comprise a leader node that may implement query planning to generate query execution plans for executing queries according to metadata obtained from a federated permission management service.

As indicated at 720, a request to obtain access to the data set may be sent to a federated permission management service by the first query engine, in some embodiments. In some embodiments, a datashare metadata service may be used to access database permission data to determine whether the association between a user of the query engine and the datashare may proceed (e.g., yes, no because not authorized, no because an unauthorized region, etc.), and based on the determination return a credentials key to encrypt the request for metadata/access credentials.

As indicated at 730, from the federated permission management service a first set of access permissions of different sets of access permissions applicable to query engines that access the data set, such that the first set of access permissions is determined by the federated permission management service as applicable to the first query engine out of the different sets of access permissions according to a user association of the first query engine may be received, in some embodiments. In some embodiments, the first set of access permissions may furthermore be applied to the one or more objects of the data set differently than a second set of access permissions of the different sets of access permissions as applied to the one or more data objects of the data set, but both the first set of access permissions and the second set of access permissions provide access to at least some of the data set. The first set of access permissions may be obtained based on interactions between the federated permission management service and the metadata proxy service as discussed in FIGS. 4-5.

As indicated at 740, the query that accesses the one or more objects of data set according to the first set of access permissions may be performed by the first query engine, in some embodiments. In some embodiments, the access permissions may be decrypted using a metadata encryption key before the first query engine has sufficient information to perform the query.

Figure 8:
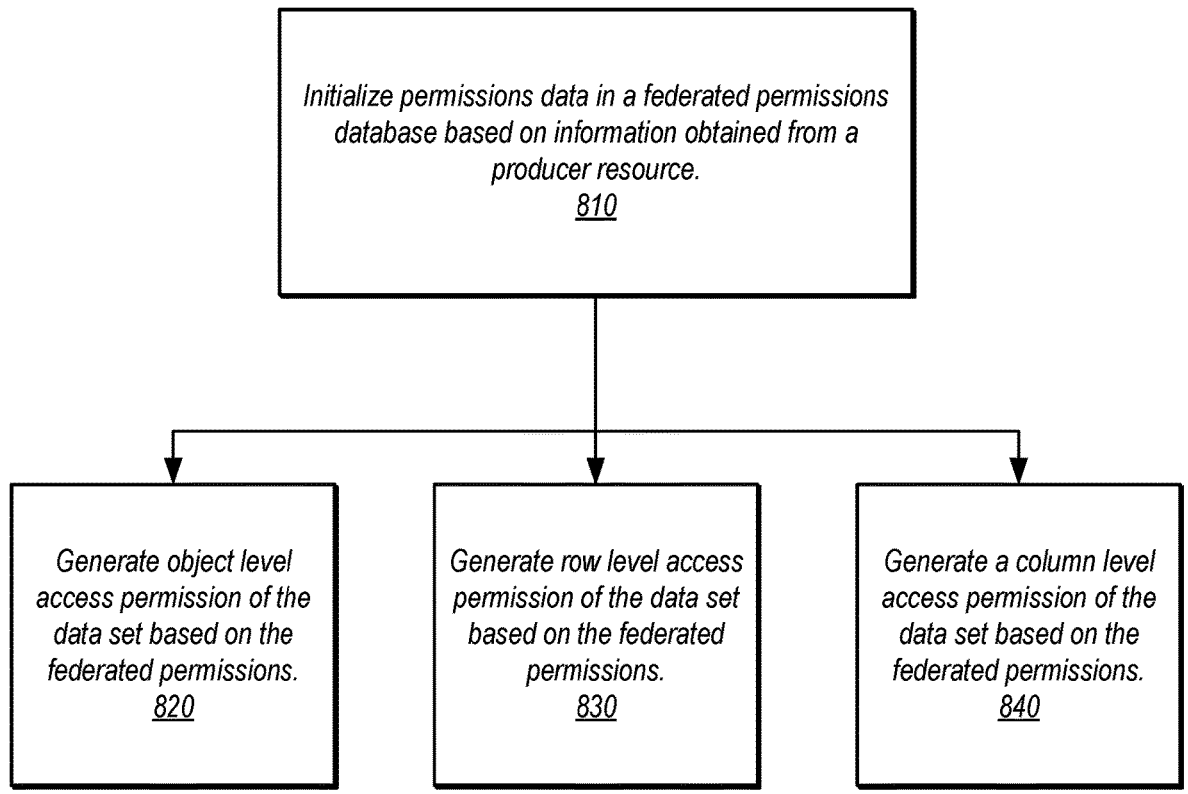
FIG. 8 is a high-level flowchart illustrating methods and techniques to implement defining permissions in a federated permissions management service to allow access to custom data sets, according to some embodiments.

FIG. 8 is a high-level flowchart illustrating methods and techniques to implement authorizing query performance, according to some embodiments. As indicated at 810, a permissions data in a federated permissions database may be initialized based on information obtained from a producer resource. In some embodiments, the federated permissions database may include access permissions from data producers ranging across multiple databases. The federated permission management service may request via a metadata proxy service one or more catalog of the objects of the datashare shared with the consumer to generate the database. For example, a lookup request may identify the consumer and datashare via identifiers, look for policies attached to the consumer, datashare, and/or the database service, to determine what access is allowed for the consumer with respect to the datashare. In some embodiments, if the policy for the shared database does not authorize the consumer database engine to access the shared database, then the request to obtain the metadata may be denied.

As indicated at 820, an object level access permission of the data set based on the federated database of permissions is generated, in some embodiments. Based on the federated permissions and the relevant simple metadata as discussed in FIG. 1, the federated permission management service may generate an access permissions at a fine-grained resolution, such as an object-by-object level permissions. As indicated at 830, a row level access permission of the data set based on the federated database of permissions is generated and as indicated at 840, a column level access permission of the data set based on the federated database of permissions is generated, in some embodiments. As discussed in FIG. 4, the fine-grained access permissions, such as the object level/column level/row level access permissions may be for a data that is distributed across multiple physical resources and resource configurations.

FIG. 9 is a high-level flowchart illustrating methods and techniques to implement generating federated permissions to allow access to custom data sets for multiple clients, according to some embodiments. As indicated at 910, a request to obtain access to a data set from a first query engine may be received at a federated permission management service, in some embodiments. As discussed in FIG. 4 and FIG. 7, a federated permission management service may receive a request to define data lake-wide permissions that encompass multiple databases or other data stores managed by (or accessible in conjunction with) the federated permission management service. In some embodiments, the request to generate permissions may allow access to only a subset of the data set as allowed according to the datashare of the producer whereas in other embodiments, the permissions may allow access to all of the data shared according to the datashare.

As indicated at 920, a first set of access permissions as applicable to the first query engine out of different sets of access permissions according to a user association of the first query engine, such that the first set of access permissions as applied to the one or more objects of the data set is different than a second set of access permissions of the different sets of access permissions as applied to the one or more data objects of the data set, and both the first set of access permissions and the second set of access permissions provide access to at least some of the data set may be determined. As discussed in FIG. 4, in some embodiments, if the policy for the shared database does not authorize the consumer database engine to access the shared database, then the request to obtain the metadata may be denied.

As indicated at 930, the first set of access permissions for the data set specified via an interface at the federated permission management service, such that the first set of access permissions is one of different sets of access permissions applicable to query engines that access the data set may be generated. In some embodiments, the first set of access permissions may furthermore be applied to the one or more objects of the data set differently than a second set of access permissions of the different sets of access permissions as applied to the one or more data objects of the data set, but both the first set of access permissions and the second set of access permissions provide access to at least some of the data set. In some embodiments, the first set of access permissions may be obtained based on interactions between the federated permission management service and the metadata proxy service as discussed in FIGS. 4-5.

As indicated at 940, the first set of access permissions may be sent to the first query engine. In some embodiments, the first set of access permissions may allow the first query engine to access different versions of the data set that correspond to the different portions and permissions of the different clients, as discussed in FIGS. 1 and 5.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements fay be added, reordered, combined, omitted, modified, etc.

Embodiments of providing access to custom data sets stored in a data lake service for a client using a federated permission as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node, compute node, computing device, compute device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Figure 10:
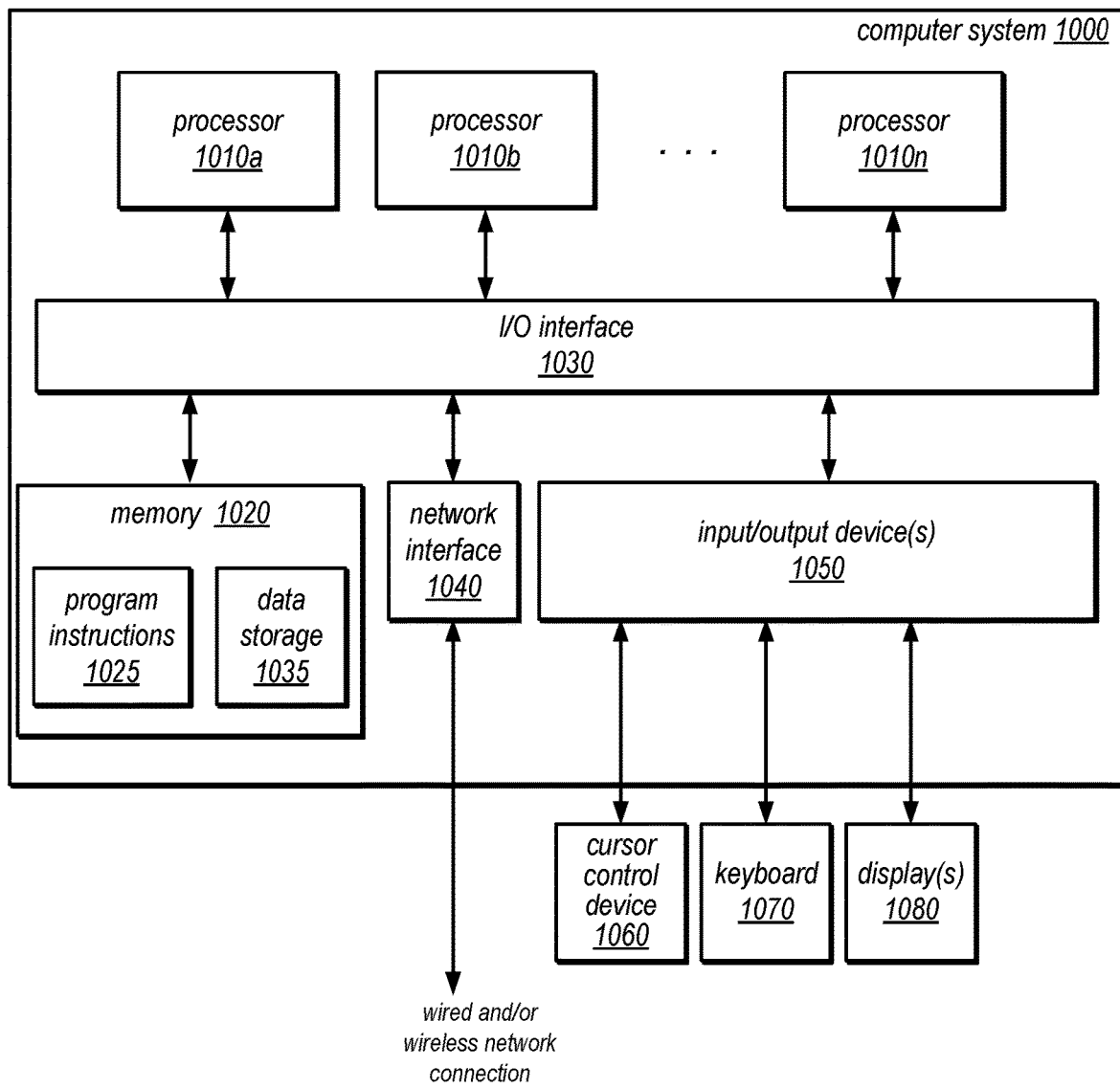
FIG. 10 illustrates an example system that implements the various methods, techniques, and systems described herein, according to some embodiments.

As shown in FIG. 10, memory 1020 may include program instructions 1025, that implement the various methods and techniques as described herein, and data storage 1035, that may include various data accessible by program instructions 1025. In one embodiment, program instructions 1025 may include software elements of embodiments as described herein and as illustrated in the FIGS. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
    one or more processors; and
    memory to store computer-executable instructions that, when executed, cause the one or more processors to:
        receive, at a first consumer cluster, a query that accesses one or more objects of a database stored in a data storage service;
        send, by the first consumer cluster, a request to obtain access to the database to a federated permission management service;
        receive, from the federated permission management service:
            a first set of access permissions for the database specified, at least in part, via an interface at the federated permission management service, wherein the first set of access permissions is one of a plurality of different sets of access permissions applicable to consumer clusters that access the database, wherein the first set of access permissions is determined by the federated permission management service as applicable to the first consumer cluster out of the plurality of different sets of access permissions according to a user association of the first consumer cluster, wherein the first set of access permissions as applied to the one or more objects of the database is different than a second set of access permissions of the plurality of different sets of access permissions as applied to the one or more data objects of the database, and wherein both the first set of access permissions and the second set of access permissions provide access to at least some of the database; and
        perform, by the first consumer cluster, the query that accesses the one or more objects of database according to the first set of access permissions.

2. The system of claim 1, wherein the first set of access permissions include an object level access permission of a table of the database, row level access permission of the database, and a column level access permission of the database.

3. The system of claim 1,
    wherein the federated permission management service comprises a federated database of permissions to be viewed by the first consumer cluster shared by a producer resource of the database; and
    wherein the first set of access permissions for the database is generated based on a metadata request to a metadata proxy service associated with the producer resource of the database.

4. The system of claim 3, wherein first consumer cluster and the producer resource of the database are in separate services.

5. The system of claim 1, wherein the first set of access permissions comprises a metadata of a schema of the database, and an encrypted access credentials to access the one or more objects of the database stored in the data storage service.

6. A method, comprising:
    receiving, at a first query engine, a query that accesses one or more objects of a data set stored in a data storage service;
    sending, by the first query engine, a request to obtain access to the data set to a federated permission management service;
    receiving, from the federated permission management service:
        a first set of access permissions for the data set specified, at least in part, via an interface at the federated permission management service, wherein the first set of access permissions is one of a plurality of different sets of access permissions applicable to query engines that access the data set, wherein the first set of access permissions is determined by the federated permission management service as applicable to the first query engine out of the plurality of different sets of access permissions according to a user association of the first query engine, wherein the first set of access permissions as applied to the one or more objects of the data set is different than a second set of access permissions of the plurality of different sets of access permissions as applied to the one or more data objects of the data set, and wherein both the first set of access permissions and the second set of access permissions provide access to at least some of the data set; and
    performing, by the first query engine, the query that accesses the one or more objects of data set according to the first set of access permissions.

7. The method of claim 6, further comprising:
    retrieving, by the first query engine, a credentials key from a data sharing metadata service associated with a first query engine; and
    encrypting, by the first query engine, the request to obtain access to the data set based on the credentials key retrieved from the data sharing metadata service, wherein the encrypted request is configured to be decrypted by the federated permission management service based on validation of the federated permission management service by the data sharing metadata service.

8. The method of claim 6, wherein the first set of access permissions include an object level access permission of a table of the data set, row level access permission of the data set, and a column level access permission of the data set.

9. The method of claim 6,
wherein the federated permission management service comprises a federated database of permissions to be viewed by the first query engine shared by a producer resource of the data set; and
wherein the first set of access permissions for the data set is generated based on a metadata request to a metadata proxy service associated with the producer resource of the data set.

10. The method of claim 9, wherein first query engine and the producer resource of the data set are in separate services.

11. The method of claim 6, wherein the first set of access permissions comprises a metadata of a schema of the data set, and an encrypted access credentials to access the one or more objects of the data set stored in the data storage service.

12. The method of claim 11, further comprising:
decrypting the access credentials to obtain permissions to access the one or more objects of the data set; and
generating a query plan for retrieving the one or more objects of the data set based on the decrypted access credentials.

13. The method of claim 11, wherein the first set of access permissions from the federated permission management service is granted to the federated permission management service by another user associated with a producer resource of the data set.

14. One or more non-transitory, computer-readable storage media, storing program instructions that when executed on or across one or more computing devices cause the one or more computing devices to implement:
receiving, at a first consumer node, a query that accesses one or more objects of a data set stored in a data storage service;
sending, by the first consumer node, a request to obtain access to the data set to a federated permission management service;
receiving, from the federated permission management service:
a first set of access permissions for the data set specified, at least in part, via an interface at the federated permission management service, wherein the first set of access permissions is one of a plurality of different sets of access permissions applicable to consumer nodes that access the data set, wherein the first set of access permissions is determined by the federated permission management service as different sets of access permissions according to a user association of the first consumer node, wherein the first set of access permissions as applied to the one or more objects of the data set is different than a second set of access permissions of the plurality of different sets of access permissions as applied to the one or more data objects of the data set, and wherein both the first set of access permissions and the second set of access permissions provide access to at least some of the data set; and
performing, by the first consumer node, the query that accesses the one or more objects of data set according to the first set of access permissions.

15. The one or more non-transitory, computer-readable storage media of claim 14, wherein the first set of access permissions include an object level access permission of a table of the data set, row level access permission of the data set, and a column level access permission of the data set.

16. The one or more non-transitory, computer-readable storage media of claim 14,
wherein the federated permission management service comprises a federated database of permissions to be viewed by the first consumer node shared by a producer resource of the data set; and
wherein the first set of access permissions for the data set is generated based on a metadata request to a metadata proxy service associated with the producer resource of the data set.

17. The one or more non-transitory, computer-readable storage media of claim 16, wherein first consumer node and the producer resource of the data set are in separate services.

18. The one or more non-transitory, computer-readable storage media of claim 14, wherein the first set of access permissions comprises a metadata of a schema of the data set, and an encrypted access credentials to access the one or more objects of the data set stored in the data storage service.

19. The one or more non-transitory, computer-readable storage media of claim 18, storing further program instructions that when executed on or across the one or more computing devices, cause the one or more computing devices to further implement:
decrypting the access credentials to obtain permissions to access the one or more objects of the data set; and
generating a query plan for retrieving the one or more objects of the data set based on the decrypted access credentials.

20. The one or more non-transitory, computer-readable storage media of claim 18, wherein the first set of access permissions from the federated permission management service is granted to the federated permission management service by another user associated with a producer resource of the data set.

* * * * *